F. W. BAUMGAERTNER.
CYCLOMETER.
APPLICATION FILED AUG. 14, 1914.
1,209,382.
Patented Dec. 19, 1916.
2 SHEETS—SHEET 2.
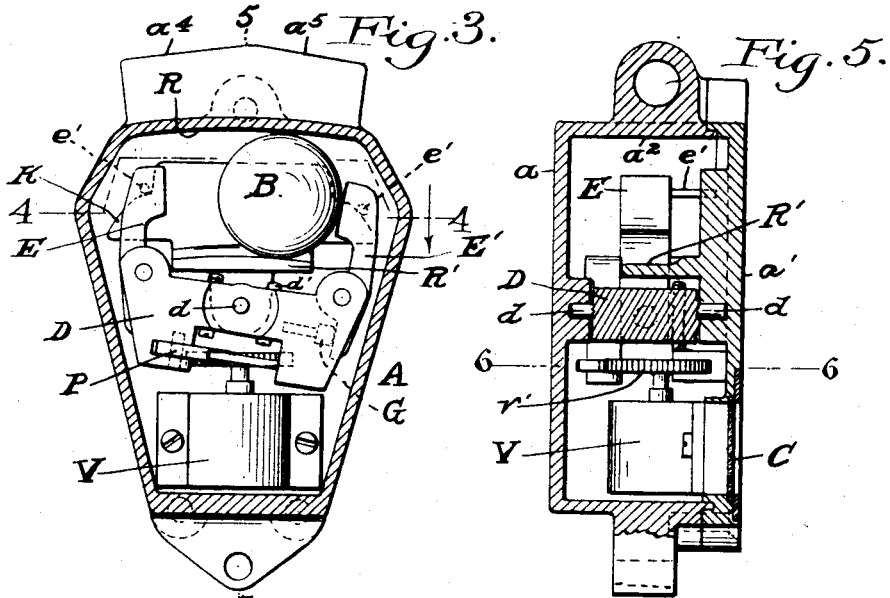
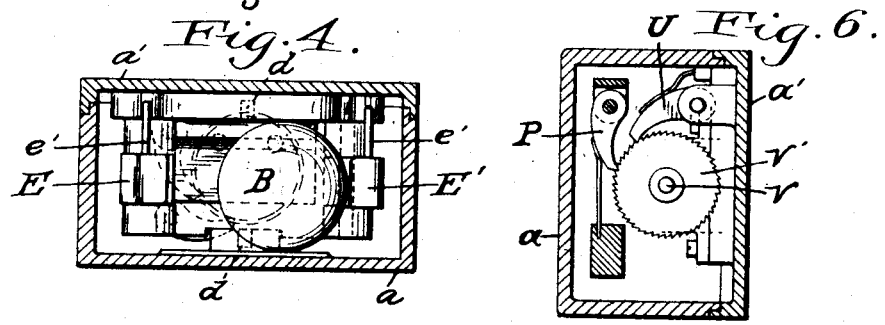
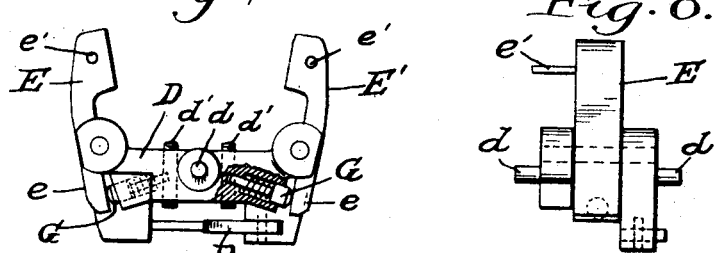
Witnesses
Inventor
Friedrich W. Baumgaertner
by Thurston & Kwis
Attys

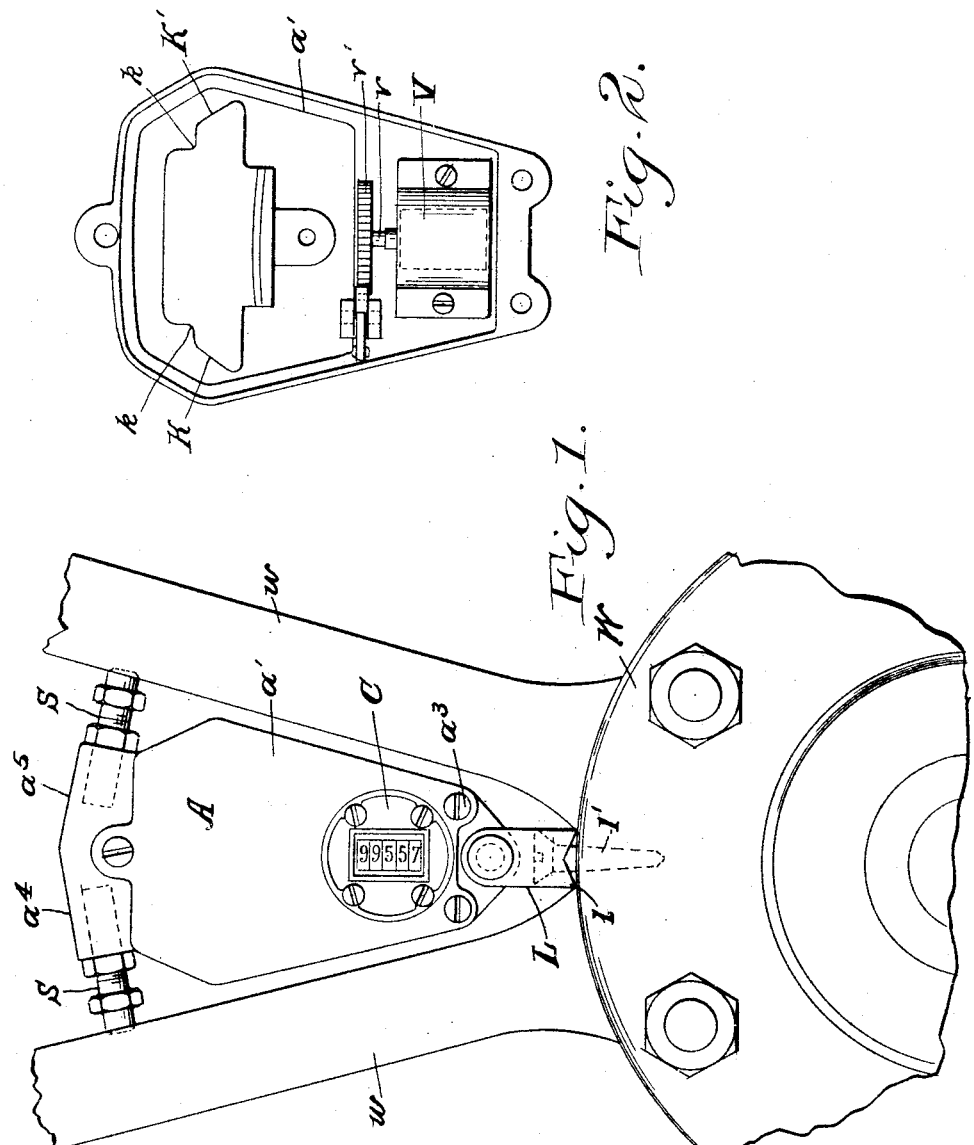

UNITED STATES PATENT OFFICE.

FRIEDRICH W. BAUMGAERTNER, OF CLEVELAND, OHIO, ASSIGNOR TO ARTHUR J. HALLE, OF CLEVELAND, OHIO.

CYCLOMETER.

1,209,382.

Specification of Letters Patent.   Patented Dec. 19, 1916.

Application filed August 14, 1914.   Serial No. 856,718.

*To all whom it may concern:*

Be it known that I, FRIEDRICH W. BAUM-GAERTNER, a citizen of the United States, residing at Cleveland, in the county of Cuyahoga and State of Ohio, have invented a certain new and useful Improvement in Cyclometers, of which the following is a full, clear, and exact description.

The object of this invention is to fill a long felt want for a reliable, inexpensive, self-contained cyclometer,—that is to say, a cyclometer which, when attached to a revolving body, will, without external assistance, as, for example, a non-rotating operating member, reliably register and indicate either the number of revolutions of said body, or some translated equivalent thereof, as, for example, the mileage traveled by a vehicle having said revolving body for one of its wheels. One obvious use of an instrument of this sort is on an automobile for the purpose of registering and indicating the mileage traveled. The specific form of the invention shown is especially contrived for this use, in that it is so constructed that it may be secured to one of the wheels between the spokes, where it will be less liable to be struck by external objects than if placed anywhere else on the wheel; and so that it will remain operative and accurate under all of the adverse conditions to which it will be subjected when the automobile travels over rough roads.

Any instrument which will operate reliably under the varying and adverse conditions incident to use when attached to the wheel of a rapidly moving automobile on a rough road may be successfully used on almost any rotating body. Indeed, if said wheel or other form of rotating body be so mounted that it turns smoothly and at not too high a speed a number of the refinements of the instrument, as hereinafter described, might be omitted; although the inscribed, might be omitted; although the instrument, as shown, containing such refinements, is adapted for almost universal use for registering and indicating the number of revolutions or some translated equivalent thereof, of any rotating body to which it is applied.

The invention consists in the construction and combination of parts shown in the drawing and hereinafter described and definitely pointed out in the appended claims.

In the drawings, Figure 1 is a side elevation of a part of a wheel showing said instrument secured thereto in operative position. Fig. 2 is a rear elevation of the front casing member when the same contains only the registering devices of the instrument. That is to say, when none of the operating devices are shown. Fig. 3 is a rear elevation of the instrument complete when the rear plate of the rear casing member has been cut away. Fig. 4 is a sectional end view of the instrument in the plane indicated by line 4—4 on Fig. 3. Fig. 5 is a sectional side elevation in the plane indicated by line 5—5 on Fig. 3. Fig. 6 is a sectional view in the plane indicated by line 6—6 on Fig. 5. Fig. 7 is a detached front elevation partly sectioned of the rocker and the parts carried thereby; and Fig. 8 is a side view of the parts shown in Fig. 7.

Referring to the parts by letters, A represents a dust and water tight casing which is composed of two separately connected parts $a$, $a^1$, of which the former is provided with a forwardly projecting marginal flange $a^2$ against which the other member is fastened by screws $a^3$. Within this casing all of the working parts of the device are contained. These working parts include a registering and indicating device V which may be an ordinary Veeder cyclometer, and is shown as such, although any other suitable equivalent device may be employed. This cyclometer as shown is fixed to the inner face of the front casing, $a$, and in such a position that the indications of said cyclometer may be read through a glass window C sealed over a hole in said casing member. The operating shaft $v$ of the cyclometer carries at its outer end a ratchet wheel $v^1$, having the required number of teeth. A spring-actuated dog U which is pivoted to the same casing member, engages the teeth of the ratchet wheel and prevents backward movement thereof.

A spherical weight or ball B, which is preferably made of steel, about one inch in diameter, is located in a ball race within the casing, between the outer and inner raceway walls R, R$^1$. The outer wall R is a part of the marginal flange $a^2$. Its inner surface is concave, and is preferably an arc shaped surface having a diameter such that when the instrument is secured to a wheel said surface will be concentric with said wheel. The inner wall R$^1$ of this ball race is a rearwardly projecting flange, which is made integral with the front casing member $a'$. Preferably its outer surface is likewise arc shaped and concentric with the outer raceway wall; but this is not of great importance, because, when the instrument is in operation, i. e., when the wheel to which it is attached is in rotation, the ball will not touch this flange at all, but will roll back and forth in contact with the arc shaped raceway wall R. The only real function which the flange $R^1$ performs, is to confine the ball in said raceway when the wheel R is not in rotation, or when the instrument has not been secured to a wheel.

Between the flange $R^1$ and the ratchet wheel $v'$ is an oscillating member adapted to be moved, first, in one direction, and then in the other, through a fixed path, by the action of the ball B thereon. This oscillating member as shown, is a centrally pivoted lever D, the pivot of which is parallel with the axis of the wheel W. This lever is preferably pivoted by means of two oppositely extended trunnions $d$ which go into holes formed in the front and rear casing members. A spring actuated pawl P is pivoted to this lever in position to engage the teeth of the ratchet wheel $v'$ in such manner that, every time said lever moves to one end of its path of travel, said pawl will turn the ratchet wheel a determined arcual distance. When said lever moves to the other end of its path, this pawl will slip idly over the ratchet. The rocking of this lever D is limited at both ends of its path by the engagement with the flange $R'$, of set screws $d'$, which screw through the opposite end of said lever.

The lever D carries two arms E, E' which are respectively pivoted to opposite ends of said lever, and are extended therefrom outward part way across the opposite ends of the ball race, and into the path of the movable ball therein. A spring plunger G is mounted in each end of lever D, so that it may engage the tail piece $e$ of the associated arms E, E'. These two spring plungers tend to so swing said arms that their outer ends will move toward each other and toward the interposed ball. The movement of said arms in the opposite direction is limited by the engagement of said tail pieces $e$ with adjacent parts of the lever D.

On the front casing member $a'$ are the rearwardly extended raised flanges K, K' whose outer surfaces are slightly beveled as shown. Each of these flanges has a notch $k$. On each of the arms E, E' is a forwardly projecting pin $e'$ which is forced by the action of the associated spring plunger G into engagement with the associated flange, and into the adjacent notch $k$, when the lever D is in position to permit this.

On the outer end of the casing are two screw threaded bosses $a^4$, $a^5$, which respectively receive the screws S. By turning these screws when the casing A has been properly located between two spokes $w$, so as to cause them to move out of said bosses, the outer pointed ends of the screws will be forced into the surfaces of the adjacent wood spokes of the wheel, and thereby hold the outer end of said device immovable with respect to said spokes. At the inner end of the casing a link L is pivoted, and it extends inward from its pivot, and has an operative connection with the hub of the wheel. The inner ends of this link may simply have sharpened edges $l$ which will bite into the wood, or it may have a screw $l'$ which screws into the hub. Of course, any other suitable means may be provided for securing the device to the wheel, but those shown are efficient and suitable for securing the device to a wood wheel in the best position for its successful employment; i. e. between two spokes and as close as possible to the axis of the wheel W.

When the described instrument is attached to a wheel, and particularly to an automobile wheel, it will operate as follows: When, by the turning of said wheel, that side of the instrument which appears at the right of Fig. 3 becomes the lower side of the instrument, the ball will fall by gravity and will strike the arm E' and will rock it on its pivot as far as it will go, and then will cause lever D to rock to one end of its path of travel. As it reaches this position the pin $e'$ on the arm E carried by the other end of lever D will enter the adjacent notch $k$ and thereby the lever D will be temporarily locked in the position shown; because the shoulder $k'$ of said notch is now interposed in the path in which said pin $e'$ would have to move, if the lever D were moved away from the position shown,—wherefore such movement is impossible. The parts are now in the position shown in Fig. 3. As the wheel turns, the left side of the instrument, as shown in said figure, will become the lower side, whereupon the ball will again fall by gravity, this time to the opposite end of the raceway. It will strike arm E and rock it on its pivot, thereby withdrawing the pin $e'$ from the notch $k$. This unlocks the lever D, which thereupon rocks to the other extreme end of its path. When it reaches this position, the pin $e'$ carried by the arm E' enters the adjacent notch $k$ and thereby temporarily locks the lever D in this new position.

In the normal operation of the instrument therefore it is apparent that during one half of each revolution of the supporting wheel, the ball will fall by gravity from one end to the other of the ball race, and that during the other half revolution the ball will fall back to its original position, and that the falling of the ball will cause the oscillating member D, during each complete revolution of the supporting wheel, to make one complete movement back and forth, which produces the required advancing movement of the shaft of the cyclometer.

The temporary locking of the lever D at each end of its path insures that there shall be only one complete back and forth movement of lever D during each revolution of the supporting wheel, and this is, of course, necessary, if the indications of the instrument are to be accurate. If the lever D were not so temporarily locked there might be two or three movements of lever D during each half revolution of the supporting wheel, which movements might produce corresponding movements of the cyclometer shaft. If, for example, the ball, when it reaches the lower end of the raceway, should rebound, or be thrown upward by a severe jolt of the wheel, due to the unevenness of the road, it might go up far enough and with force enough to rock the lever D; in which event, when the ball settled down again, it would rock the lever D in the contrary direction. This might well be the result of employing, on an automobile which was traveling over rough roads, an instrument substantially as described, except for the means for temporarily locking the lever D. This lever D must be so mounted as to have very little friction; it only moves a short distance, and the ball race is very short,—indeed, the ball need have a movement of not more than a half an inch. By extensive experiments I have become satisfied that if the ball be a steel ball, of about one inch in diameter, weighing about two ounces, and if its permissible movement be about half an inch only, and if the lever D be temporarily locked at both ends of its path, there will never be, under practical conditions, any such rebounding or upthrown movement of the ball as will be able to both unlock the lever and cause it to move.

The described instrument has a spherical weight which is loosely placed in a raceway whose outer wall has an arc shaped surface which is concentric with the supporting wheel. When so constructed the instrument has one characteristic which is unique in devices of this character, and which practically insures its operation in the described manner, viz. a line drawn from the center of rotation of the wheel through the center of gravity of the weight will always, regardless of the positions of the weight in the raceway, pass through what is, at that instant, the center of oscillation of the weight,—that is to say, the point at which the spherical weight contacts with the arc shaped wall of the raceway. Or, in other words, the center of gravity of the weight will never lie outside of a line drawn from the center of rotation of the wheel to the center of oscillation of the weight. With this construction therefore the centrifugal force acting on the weight can never effectively oppose the gravity-induced movement of the weight, nor have any influence thereon other than to increase or decrease the frictional resistance to the movement of the weight. Moreover, when the weight is a true sphere, this frictional resistance is minimized to the last degree, in view of other conditions,—that is to say, it is less than if the weight were of any other shape or were supported and mounted in any other manner.

I know that there are several prior patents which show self contained instruments containing movable weights and registering mechanism for said weights to actuate; and that it is pretended that when such instruments are secured to a wheel the weight will drop twice during each revolution of said wheel from one end to the other of the prescribed path of the weight, and with sufficient force to actuate the registering mechanism. But in every one of the instruments shown in these prior patents the construction is such that when the weight is at one end or the other of its prescribed path the center of gravity of the weight will be a substantial and effective distance outside of a line drawn from the center of rotation of the wheel to the center of oscillation of the weight. In every instrument where such conditions exist the centrifugal force generated by the rotation of the wheel will oppose, to a greater or less degree, the desired gravity induced movements of the weight. The greater the speed at which the wheel is turned, the stronger will be this opposing centrifugal force. In fact, I venture the assertion that it is not possible to make a device of this general character adapted for application to a vehicle wheel of any of the standard sizes employed, which will operate successfully when the vehicle is traveling at say 25 or 30 miles an hour, if the weight has a movement sufficiently long for the required purpose, and if the center of gravity of the weight at the ends of its path lies outside of a line drawn from the axis of the wheel to the center of oscillation of the weight. In fact, I believe that no device of this general character will be operative, under practical conditions, unless the weight be a ball or a cylinder, and unless the raceway is approximately concentric with the axis of the wheel. Obviously, it is not essential that the arc-shaped outer wall of the raceway shall be exactly concentric with the axis of rotation of the wheel. There may be some slight variation in the shape of this wall without rendering the device inoperative, or inaccurate, under all of the conditions to which it may be subjected in practical use. How much variation may be permitted cannot be stated with any greater exactness than to say that it must be so shaped and the movement of the weight be confined within such limits that the force of gravity acting upon the weight tending to cause it to fall must always exceed the centrifugal force opposing such falling movement by as much as is necessary to overcome the frictional resistance to said movement of the weight, and by as much as is necessary to enable the weight to acquire in falling sufficient momentum to do the work for which it is provided,—that is to actuate the registering mechanism. And since the centrifugal force varies with the speed of the wheel, account will have to be taken of the maximum speed at which the wheel may rotate in practical service. If, for example, the outer wall of the ball raceway were straight and positioned as a tangent to the center of the arc shaped raceway shown the device would be absolutely inoperative if the wheel were rotated at four or five revolutions a second, which is equivalent to a speed of 25 or 30 miles an hour of the vehicle. Somewhere between this straight race wall, and the truly concentric race wall is a form of wall with which the device might be operative if the wheel were not rotated at too great a speed; that is it might be operative under all the practical conditions which exist in connection with the operation of an automobile.

The described construction may be varied to quite an extent, and in many ways, without departing from the broad invention as defined by the claims. For example, the movable member D is shown and has been described as a rocking lever, but the pivot of the lever is not an essential, since any device which is capable of being oscillated back and forth through a short path by the movable weight could be made to serve the same purpose. The particular locking mechanism by which this movable device is temporarily locked at the ends of its path may, of course, be varied in form, and indeed might be omitted altogether, if the device is to be used on a wheel which rotates smoothly and regularly and in a manner free from jolts and jars, as, for example, on a fly wheel. The device could also be provided with means for attachment to the wheel quite different from those which are shown.

It is not essential that the device shall be placed between the spokes, although, as before stated, this is a particularly desirable quality when the device is to be secured to the wheels of an automobile.

It will, of course, be further understood that the size of the ratchet disk and the number of teeth therein will be determined by the diameter of the wheel to which the device is to be attached if the device is to be employed to indicate mileage.

Having described my invention, I claim:

1. The combination with a rotatable body whose rotations are to be counted, and a registering device thereon, of an oscillating weight which is supported on said rotatable body and is adapted to actuate said registering device, means for compelling said weight to move in a short path approximately concentric with the axis of said rotatable body, and means for confining the movement of said weight within such limits that its center of gravity cannot move so far outside of a line drawn from the center of oscillation of the weight to the center of rotation of said body, that the centrifugal force acting on the weight plus the frictional resistance to the gravity induced movement of the weight plus the force required to actuate the registering device, will exceed the force of gravity acting upon said weight.

2. The combination with a rotatable body whose rotations are to be counted, and a registering device mounted on said body, of an oscillating device adapted to actuate said registering device, an oscillating weight adapted to move said member backward and forward, and means, operable by the weight in the unlocking direction, for temporarily locking said movable member at the ends of its path.

3. The combination with a rotatable body whose rotations are to be counted, of a short ball raceway fixed to said body and having an outer wall which is approximately concentric with said body, a ball which is freely movable in said raceway, an oscillating member having arms which project into the path of said ball at opposite ends of said raceway, and a registering device adapted to be actuated by said oscillating member.

4. The combination with a rotatable body whose rotations are to be counted, of a ball raceway fixed to said body and having an outer wall which is approximately concentric with said body, a ball which is freely movable in said raceway, an oscillating member having arms which project into the path of said ball at opposite ends of said raceway, a registering device adapted to be actuated by said oscillating member, and means for temporarily locking said movable member at the ends of its path of travel,—which means are operable in the unlocking direction by said ball.

5. A cyclometer comprising in combination a casing and the following mechanism therein contained, to wit, a raceway having a concave outer wall, a ball freely movable in said raceway, an oscillating member, two arms pivotally connected with the ends of said oscillating member and extended therefrom part way across the ends of the ball raceway and into the path of the ball therein, notched flanges fixed to the casing, a pin fixed to each of said arms for engagement with said notched flanges, springs acting upon said arms to swing them toward each other and the interposed ball, means limiting the opposite movement of said arms relative to the oscillating member by which they are supported, and a registering device adapted to be operated by said oscillating member.

6. A cyclometer comprising in combination, a casing and the following parts therein contained, to wit, a fixed ball raceway whose outer wall is concave, a ball freely movable in said raceway, a rocking lever, two arms pivoted respectively to the ends of said lever and extended therefrom part way across the ends of the ball raceway and into the path of the ball therein, springs acting on said arms to move them toward each other and the interposed ball, means limiting the opposite movement of said arms relative to said lever, shoulders fixed to the casing with which parts of said arms may engage to lock the lever temporarily at the ends of its path of movement, and a registering device adapted to be operated by said lever.

7. The combination with a rotatable body whose rotations are to be counted, of a short ball raceway fixed to said body and having an outer wall which is approximately concentric with said body, a ball which is freely movable in said raceway, a registering device fixed to said rotatable body, and means operable by the ball as it drops from one end of the raceway to the other for actuating said registering device.

In testimony whereof, I hereunto affix my signature in the presence of two witnesses.

FRIEDRICH W. BAUMGAERTNER.

Witnesses:
  A. J. HUDSON,
  L. I. PORTER.

Copies of this patent may be obtained for five cents each, by addressing the "Commissioner of Patents, Washington, D. C."